United States Patent [19]

Lundsgaard

[11] Patent Number: 4,748,542

[45] Date of Patent: May 31, 1988

[54] SOLID STATE ELECTROCHEMICAL DEVICE

[75] Inventor: Jorgen S. Lundsgaard, Svendborg, Denmark

[73] Assignee: The Mead Corporation, Dayton, Ohio

[21] Appl. No.: 51,099

[22] Filed: May 15, 1987

Related U.S. Application Data

[63] Continuation-in-part of Ser. No. 3,546, Jan. 15, 1987, abandoned, which is a continuation of Ser. No. 735,880, May 20, 1985, Pat. No. 4,638,407.

[51] Int. Cl.$^4$ ............................................... H01G 9/00
[52] U.S. Cl. ..................................... 361/433; 252/62.2
[58] Field of Search .......... 252/62.2; 361/323, 433 M, 361/328

[56] References Cited

U.S. PATENT DOCUMENTS

| | | | |
|---|---|---|---|
| 3,536,963 | 10/1970 | Boos | 361/433 |
| 3,978,378 | 8/1976 | Tigner et al. | 361/323 |
| 4,303,748 | 12/1981 | Armand et al. | 429/192 |
| 4,562,511 | 12/1985 | Nishino et al. | 361/433 X |
| 4,638,407 | 1/1987 | Lundsgaard | 361/433 |

*Primary Examiner*—Donald A. Griffin
*Attorney, Agent, or Firm*—Smith & Schnacke

[57] ABSTRACT

An all-solid state double layer capacitor and an all-solid state multicell electrochemical device are disclosed. The electrolyte material employed in the devices consists of an ionically conductive polymer such as polyethylene oxide with an inorganic salt which renders the polymer material ionically conductive.

8 Claims, 1 Drawing Sheet

SOLID STATE ELECTROCHEMICAL DEVICE

CROSS-REFERENCE TO RELATED APPLICATIONS

This application is a continuation-in-part of U.S. Pat. application Ser. No. 003,546 filed Jan. 15, 1987 now abandoned, which in turn is a continuation of U.S. Pat. application Ser. No. 735,880 filed May 20, 1985, now U.S. Pat. No. 4,638,407.

FIELD OF THE INVENTION

The invention relates to a all-solid state electrochemical device of the type comprising a plurality of bipolar electrodes and an electrolyte layer or layers arranged to provide a functional electrochemical device. More particularly, it relates to a solid state capacitor.

BACKGROUND OF INVENTION

The structure of a double layer capacitor is well-known to those skilled in the art. Such a cell comprises a pair of electronically conductive elements, for example, metal foil or discs, having an electrolyte solution sandwiched therebetween. The electrolyte solution is divided into two electrodes by an ion-permeable separator. The electrolyte solution is a liquid or paste which is sealed within the capacitor structure using, for example, a gasket. A capacitor of this type is described in, for example, U.S. Pat. No. 3,536,963.

It is also known to arrange a plurality of carbon-containing, bipolar electrode structures in functional arrangement and to provide an electrolyte liquid or paste between adjacent pairs of bipolar electrodes. Such a multicell device is shown in U.S. Pat. No. 4,154,068. This patent discloses a structure consisting of a plurality of bipolar, carbon-plastic electrode structures. The structures are formed by first molding an electronically conductive, carbon-containing, plastic sheet, and then providing a dielectric frame around each of the resulting sheets. When the individual elements are welded together, chambers are formed which are capable of holding liquid or paste electrolyte between each adjacent pair of bipolar electrodes. These chambers are filled with a suitable liquid or paste electrolyte composition.

The invention avoids the problems associated with electrochemical devices or double-layer capacitors of the aforesaid type which contain liquid or paste electrolyte material. Devices which utilize a liquid or paste electrolyte inevitably suffer from problems of leakage and resulting hazards. Additionally, a non-liquid device would avoid the separate step of adding a seal or gasket to contain the electrolyte.

In Europe, considerable attention has been focused upon the fabrication of solid state batteries, based upon, for example, lithium metal. Lithium has been of interest due to its low density and highly electropositive nature. Such cells incorporate, for example, a lithium or lithium based anode, and a cathode containing a vanadium oxide compound, $V_6O_{13}$, for example, as the active material. The lithium anode may be a foil. The electrolyte layer consists of a polymer such as polyethylene oxide and a lithium salt. The cathode structure consists of a composite material containing the active cathode material $V_6O_{13}$, lithium salt and acetylene black. These batteries have been found to be beneficial in terms of case of construction, ruggedness, interfacial properties, open circuit voltage, energy density, and rechargability.

It is known and common to fabricate capacitors using ceramic materials. The use of ceramics in a solid state capacitor, however, involves serious drawbacks. First, the ceramic only operates at extremely high temperatures. Also, the ceramic material cannot be mixed effectively with another material to provide a composite material having a large operable surface area.

Apart from the aforesaid, electrochemical devices and double-layer capacitors of the type described, which are known and in use today, employ a liquid, paste, or molten electrolyte. The need exists for a device which does not suffer from the drawbacks of a device utilizing liquid or paste electrolyte, yet which has increased electrical characteristics due to large surface area and which is operable at moderate temperatures.

SUMMARY OF THE INVENTION

The invention relates to a double layer capacitor and to a multicell electrochemical device wherein the electrolyte material consists of an ionically conductive polymeric material. The devices of the invention are entirely solid-state. The solid-state electrolyte material of the invention comprises a polymer, for example, polyethylene oxide, and an inorganic salt which renders the polymer ionically conductive. The inorganic salt may be selected from the group consisting of $LiClO_4$, $NaClO_4$, $LiAsF_6$, $LiF_3SO_3$, $LiBF_4$ and others. Suitable bipolar electrode structures containing electronic conductors with large surface areas such as activated carbon, porous metal, intercalation materials, etc., for use in connection with the aforesaid electrolyte to provide an all-solid state electrochemical device, are disclosed.

DESCRIPTION OF THE INVENTION

The nature and characteristic features of the invention will be more readily understood from the following description taken in connection with the accompanying drawings forming part herein in which:

FIG. 1 a double-layer capacitor constructed according to the invention; and

FIG. 2 a multicell electrochemical device constructed according to the invention.

FIG. 3 is a schematic illustration of the double layer capacitor of claim 1.

It should, of course, be understood that the description and drawings herein are merely illustrative and that various modifications and changes can be made in the structure disclosed without departing from the scope of the invention.

DETAILED DESCRIPTION OF THE INVENTION

Figure 1:
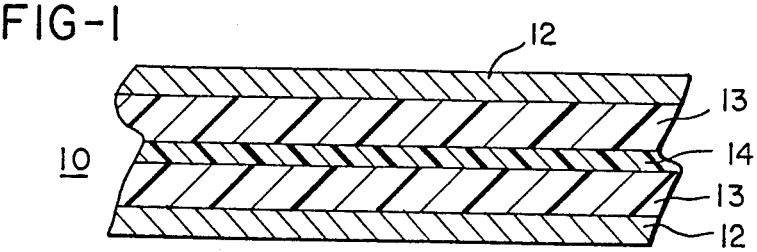

In one embodiment, the invention comprises a double layer capacitor structure wherein the construction is entirely solid state. The conventional liquid, paste, or molten electrolyte is replaced with an ionically-conductive polymer electrolyte. It is contemplated, however, to also employ the invention in electrochemical devices having multiple layers. In such an arrangement, the electrode structures are bipolar in nature and are interleafed with layers of the solid-state electrolyte material.

According to the present invention, the ionically conductive layers interspersed between the electrodes consist of the ionically conductive polymeric material. Polymers and salts useful in providing ionically conductive polymer compositions useful in the present invention are described in U.S. Pat. No. 4,303,748 to Armand, U.S. Pat. No. 4,654,279 to National Bureau of Standards and European published application No. 0145498A2. The solid state electrolyte material of the invention is ionically conductive but electronically non-conductive. Typically it is composed of a polymer such as polyethylene oxide and a suitable inorganic salt, the inorganic salt being one which renders the polymer ionically conductive. Examples of inorganic salts which have been found operable in the invention include lithium tetraborate ($LiBF_4$), sodium perchlorate ($NaClO_4$), lithium perchlorate ($LiClO_4$), and lithiumtrifluorosulfonate ($LiCF_3SO_3$). The resulting polymer composition provides a preferred solid state ion-conductive material for use in a double layer capacitor, or as the electrolyte layer in a multicell electrochemical device. It has been found preferable to employ about 60 to 95 percent by weight polymer and about 5 to 40 percent by weight of inorganic salt in the composition.

The bipolar electrode structures of the multicell electrochemical device are electronically and ionically conductive. Bipolar electrodes are known in the art. They are often formed from carbon black and a plastic material by extrusion molding. It is preferred to incorporate a metal salt in the composition to render the electrode ionically as well as electronically conductive. Electrodes of this type are also described in the aforesaid Armand patent.

Typically, the bipolar electrode composition is about 70 to 85 parts by weight polymer, 5 to 15 parts by weight conductor and about 15 to 30 salt. The bipolar electrode structures may be formed by any well known method of molding or extrusion. Amounts will vary with the nature of the materials selected.

Although any known plastic electrode structure may be employed in the electrochemical devices and capacitors of the invention, it has been found preferable to employ the particular electrode compositions hereinafter described. The preferred electrode compositions are based upon activated carbon and an ionic conductive polymer.

A preferred feature of the above described electrode structure is their high capacitance due to the high available surface area of finely divided activated carbon throughout the electrode. For this reason, the conductor should have a particle size as small as possible and typically less than 10 microns.

In accordance with the invention, it is possible to continuously fabricate each layer of the composite structure in a sheet or roll. Multilayer electrochemical devices are then readily fabricated from the resulting sheet or roll. For example, the bipolar electrode composition can be extrusion coated onto the surface of a current collector such as nickel foil. The bipolar electrode is then overcoated with an extrusion coated or a solvent cast electrolyte layer. Bipolar electrode layers and solvent cast electrolyte layers are then alternately coated with intervening layers of a current collector until the desired number of cells is achieved.

The electrochemical device of the invention may also include any number of standard cell elements such as separators, spacers, membranes, or current collectors.

Reference is now made specifically to the drawings and the embodiments of the invention shown therein.

FIG. 1 shows a solid-state double-layer capacitor 10 constructed in accordance with the invention. Top and bottom current collector layers 12 are electronically conductive and may be formed of metal, such as copper or nickel, or may be formed of an electronically conductive polymer composition. Layer 14 is a separator layer consisting essentially of an ionically conductive polymer which is electrically non-conductive, for example polyethylene oxide containing an inorganc salt. Layers 13 sandwiched between the electronically conductive elements and the ionically conductive elements comprise the bipolar electrodes. Layer 13 are formed of ionically conductive polymer, for example polyethylene oxide containing an inorganic salt and a finely divided electronic conductor such as carbon.

Figure 2:
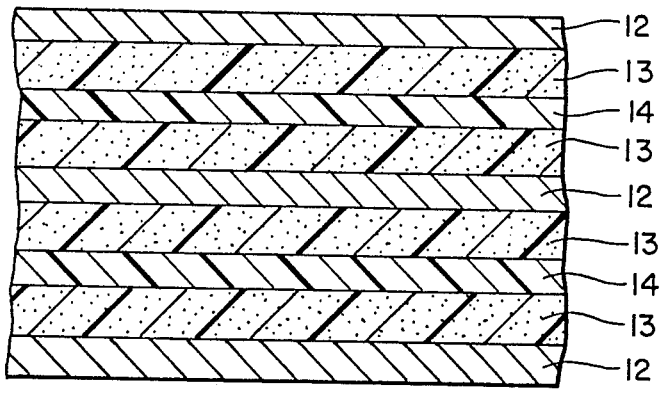

FIG. 2 shows a solid-state multicell electrochemical device 20 constructed in accordance with the invention. Bipolar electrode structures 13 are interleafed with electrolyte layers 14 and electronically conductive layers 12 to provide a functional electrochemical device. The bipolar electrodes are constructed as previously described, and consist of ionically-conductive polymeric material and an electronic conductor with large surface area, for example, activated carbon.

Figure 3:
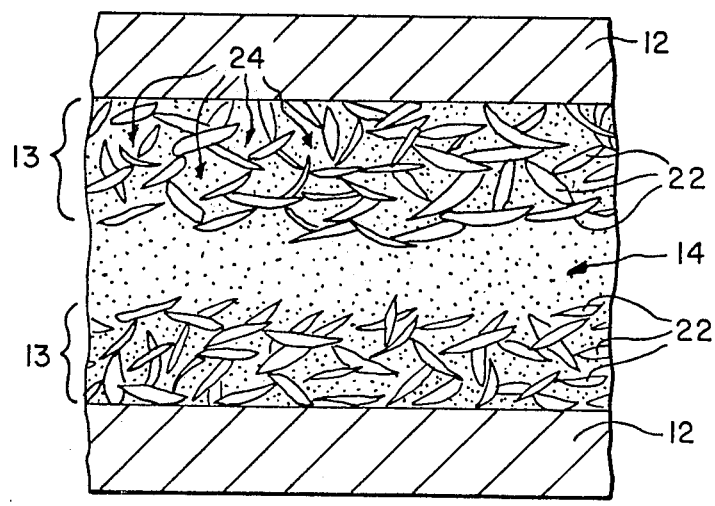

The capacitor of FIG. 1 is illustrated in more detail in FIG. 3. There, the ionic and electronic conducting networks of the bipolar electrodes 13 are illustrated in schematic detail. Specifically, the electronically conducting network is illustrated as a matrix 22 of intersecting particles having ionically conducting channels 24 of ionically conductive polymer therethrough. No attempt has been made to draw particle matrix 22 and polymeric channels 24 to scale in FIG. 3. The electronically conducting matrix of particles may be formed from a material such as carbon black whereas the ionically conductive channels are formed by a solid solution of a metal salt in a polymer.

As shown in FIG. 3, the electronically conductive material 22 is in electrical communication with the current collector 12. However, there is no electron communication across separator layer 14. On the other hand, the ionically conductive material 24 is in ionic communication with the separator layer 14 but not with the current collectors 12. Electronic conduction across layer 14 or ionic conduction to electrodes 12 would result in capacitor discharge.

Both of the aforesaid structures may be prepared as continuous sheets or rolls. One layer is laminated directly onto the underlying layer.

Having described the invention in detail and by reference to preferred embodiments thereof, it will be apparent that modifications and variations are possible without departing from the scope of the invention defined in the appended claims.

What is claimed is:

1. An all-solid-state multicell electrochemical device comprising:
   (a) at least two electronically and ionically conducting structures; and
   (b) at least one ionically conductive and electronically non-conductive solid-state electrolyte layer of an ionically conductive polymer material wherein said ionically conductive polymer is a solid solution of a metal salt and a polymer, said electrode structures and said electrolyte layers being functionally arranged to provide a capacitor.

2. The device set forth in claim 1 wherein said metal salt is selected from the group consisting of $LiCF_3SO_3$, $LiClO_4$, $NaClO_4$, and $LiBF_4$.

3. The device set forth in claim 2 wherein said electronically and ionically conducting structures contain an ionic conducting polymer and a finely divided conductor in the form of a composite.

4. The device of claim 3 wherein said ionic conducting polymer in said electronically and ionically conducting structure is a solid solution of the same polymer and the same metal salt as said ionically conductive polymer in said electrolyte layer.

5. The device of claim 4 wherein said device consist of two of said electronically and ionically conducting structures and one of said electrolyte layers.

6. The device as set forth in claim 4 wherein said conductor is carbon.

7. The device of claim 1 wherein said device is a multicell device.

8. An all-solid-state multicell electrochemical device comprising:
(a) a plurality of bipolar electrode structures containing an ionically conducting polymer and an electronic conductor having a large surface area;
(b) a plurality of solid-state electrolyte layers consisting essentially of an ionically conductive polymer material wherein said ionically conductive polymer is a solid solution of a metal salt and a polymer;
(c) a plurality of electronically conductive and ionically non-conductive layers, said electrode structures and said electrolyte layers and said electronically conductive layers being arranged to provide a capacitor.

* * * * *

UNITED STATES PATENT AND TRADEMARK OFFICE
CERTIFICATE OF CORRECTION

PATENT NO. : 4,748,542
DATED : May 31, 1988
INVENTOR(S) : Jorgen S. Lundsgaard

It is certified that error appears in the above-identified patent and that said Letters Patent is hereby corrected as shown below:

On the title page assignee should read

--(73) Assignee: MHB Joint Venture,
Dayton, Ohio --.

Signed and Sealed this

First Day of August, 1989

Attest:

DONALD J. QUIGG

*Attesting Officer*      *Commissioner of Patents and Trademarks*